(12) United States Patent
Rapp et al.

(10) Patent No.: US 7,727,566 B2
(45) Date of Patent: *Jun. 1, 2010

(54) TASTING ENERGY BAR

(75) Inventors: Edward L. Rapp, Blairstown, NJ (US);
Jamie Troy, Columbia, NJ (US);
Jeannette Dido, Hoboken, NJ (US);
Douglas Mann, Easton, PA (US);
Thomas Collins, Nazareth, PA (US);
Kevin Rabinovitch, Redondo Beach, CA (US); Ralph Lee, Hampton, NJ (US); Neil Willcocks, Fullerton, CA (US); Robert Boushell, Sparta, NJ (US); Ralph Jerome, Blairstown, NJ (US); Tiago O. Rodrigues, Marietta, PA (US); John M. Kaiser, Manheim, PA (US); Ivonne E. Nill, Boonton, NJ (US)

(73) Assignee: Mars, Incorporated, McLean, VA (US)

( * ) Notice: Subject to any disclaimer, the term of this patent is extended or adjusted under 35 U.S.C. 154(b) by 521 days.

This patent is subject to a terminal disclaimer.

(21) Appl. No.: 10/615,249

(22) Filed: Jul. 8, 2003

(65) Prior Publication Data
US 2004/0086600 A1 May 6, 2004

Related U.S. Application Data

(63) Continuation-in-part of application No. 10/272,618, filed on Oct. 15, 2002, and a continuation-in-part of application No. 10/272,571, filed on Oct. 15, 2002, and a continuation-in-part of application No. 10/271,710, filed on Oct. 15, 2002.

(60) Provisional application No. 60/394,672, filed on Jul. 8, 2002, provisional application No. 60/446,151, filed on Feb. 10, 2003.

(51) Int. Cl.
*A23L 1/29* (2006.01)

(52) U.S. Cl. .............. 426/72; 426/74; 426/89; 426/96; 426/99; 426/103; 426/601; 426/656; 426/658

(58) Field of Classification Search ........... 426/103, 426/72, 74, 659, 660, 601
See application file for complete search history.

(56) References Cited

U.S. PATENT DOCUMENTS

| 3,615,590 | A | * | 10/1971 | Avera et al. ............. 426/633 |
| 3,917,861 | A | | 11/1975 | Viera et al. ............. 426/274 |
| 3,950,545 | A | | 4/1976 | Hayward et al. ........... 426/72 |
| 3,992,556 | A | | 11/1976 | Kovacs et al. ............ 426/72 |
| 4,018,900 | A | | 4/1977 | Hayward et al. ........... 426/72 |
| 4,038,423 | A | | 7/1977 | Hayward et al. ........... 426/93 |
| 4,055,669 | A | * | 10/1977 | Kelly et al. ............. 426/93 |
| 4,276,312 | A | | 6/1981 | Merritt ................... 426/96 |
| 4,543,262 | A | | 9/1985 | Michnowski ............. 426/306 |
| 4,859,475 | A | | 8/1989 | Michnowski ............. 426/72 |
| 4,904,488 | A | | 2/1990 | LaBaw et al. ........... 426/107 |
| 5,075,121 | A | | 12/1991 | Desage et al. ........... 426/233 |
| 5,079,012 | A | | 1/1992 | Lengerich et al. ......... 426/72 |
| 5,153,177 | A | | 10/1992 | Chaundy et al. .......... 514/21 |
| 5,229,147 | A | | 7/1993 | Kubota et al. ............. 426/2 |
| 5,356,636 | A | | 10/1994 | Schneider et al. ........ 424/489 |
| 5,356,647 | A | | 10/1994 | Mason et al. ............ 426/243 |
| 5,494,696 | A | | 2/1996 | Holst et al. ............ 426/583 |
| 5,846,587 | A | | 12/1998 | Kelly et al. ............ 426/289 |
| 6,139,872 | A | | 10/2000 | Walsh .................. 424/464 |
| 6,200,611 | B1 | | 3/2001 | Ganesan et al. .......... 426/93 |
| 6,312,753 | B1 | | 11/2001 | Kealey et al. ........... 426/631 |
| 6,378,795 | B1 | | 4/2002 | Kelly et al. ............ 241/223 |
| 6,592,915 | B1 | * | 7/2003 | Froseth et al. ........... 426/93 |
| 2002/0012722 | A1 | | 1/2002 | Prosise et al. ........... 426/72 |
| 2002/0015765 | A1 | | 2/2002 | Wu .................... 426/94 |
| 2002/0064584 | A1 | | 5/2002 | Kealey et al. ........... 426/244 |
| 2002/0094359 | A1 | | 7/2002 | Prosise et al. ........... 426/72 |
| 2002/0102330 | A1 | | 8/2002 | Schramm et al. ......... 426/72 |

FOREIGN PATENT DOCUMENTS

| EP | 0 861 603 A2 | 9/1998 |
| EP | 1 323 355 A1 | 7/2003 |
| GB | 2 087 788 A | 3/1982 |
| WO | WO 90 02489 | 3/1990 |
| WO | WO 96 39869 | 12/1996 |
| WO | WO 98 07413 | 2/1998 |
| WO | 99 65336 | 12/1999 |
| WO | WO 00 42867 | 7/2000 |
| WO | 01/22835 A1 | 4/2001 |
| WO | WO 01/64044 A2 | 9/2001 |
| WO | WO 02 021937 A2 | 3/2002 |

OTHER PUBLICATIONS

Rombauer, Imma. Joy of Cooking, The Bobbs-Merrill co., Inc. MacMillan, Inc. NY, 1986, pp. 705 and 708.*

Ridderbusch, G., "Forming of Coated and Uncoated Cereal Bars," Confectionery Production, Dec. 1985, pp. 686-690.

* cited by examiner

*Primary Examiner*—Helen F Pratt
(74) *Attorney, Agent, or Firm*—Fitzpatrick, Cella, Harper & Scinto

(57) ABSTRACT

The present invention is directed to an energy bar having a mean hedonic score for consumer acceptability of at least about 5.2. Preferably, the energy bar is either a grain based energy bar or a chewy energy bar.

22 Claims, No Drawings

TASTING ENERGY BAR

CROSS REFERENCE TO RELATED APPLICATIONS

This application claims the benefit of U.S. Provisional Application Ser. No. 60/394,672 filed on Jul. 8, 2002 and U.S. Provisional Application Ser. No. 60/446,151, filed on Feb. 10, 2003, and is a continuation-in-part of U.S. patent application Ser. No. 10/271,710; U.S. patent application Ser. No. 10/272,618; and U.S. patent application Ser. No. 10/272,571, which were filed on Oct. 15, 2002, all of the above mentioned applications herein incorporated by reference.

BACKGROUND OF THE INVENTION

1. Field of the Invention

The present invention is directed to energy bars, and methods of making and improving the taste of energy bars. More particularly, the present invention is directed to energy bars that taste good, as exemplified by a mean hedonic score that is superior to similarly categorized energy bars.

2. Related Background Art

Food products identified as energy food products, such as energy bars, are gaining in popularity among all consumers. Energy bars are designed to provide a healthful nutritious serving high in protein, vitamins and minerals, in a low fat food product, shaped in a bar or other convenient form. The thought of eating a healthful nutritious energy bar that is shelf stable and packaged in a portable format is appealing to most people, especially individuals who want and/or need a functional benefit from the nutrients offered by such products.

Energy bars generally fall in one of two categories: grain based or chewy. The grain based energy bars are primarily made of a particulate matrix held together by a binder. The chewy variety is typically comprised of ingredients that have been processed into a homogeneous mass. In either case, the matrix or mass is then pressed, extruded or molded to form bar shaped pieces that are dried or solidified. Both deliver high levels of protein, vitamins and minerals, in a low fat bar. Other ingredients and toppings may be added to both the grain based and chewy energy bars.

Many of the currently marketed products do not appeal to consumers, who prefer more food like properties. Moreover, the homogeneity of the chewy bar/extruded mass makes an energy bar that has a singular taste throughout the homogeneous product. This leads to mediocre tasting products since nutritious ingredients such as protein, vitamins, and minerals, which often taste bad, are haphazardly mixed in with other ingredients. The combination degrades the overall taste of the product, leaving many of the presently marketed energy bars with an unappealing taste that consumers dislike.

For example, energy bars are typically fortified with protein powders, which appeals to most consumers who perceive protein as a desirable nutrient. Protein powders are typically made with whey proteins, soy proteins, egg proteins, caseins, and the like. In general, the protein powders along with the other ingredients are mixed together.

However, the inclusion of protein powders tends to produce a mouth drying sensation that many consumers find undesirable. The mouth drying sensation can be so intense that some consumers will only eat an energy bar with a beverage.

A method of processing a protein-containing component to improve the taste of a food product is described in U.S. Pat. No. 5,494,696 to Holst et al. ("Holst") which is directed to a partially denatured whey protein product that is 65-95% by weight protein relative to the dry matter. The protein product is further characterized by the protein denaturation level which is 55-80%, and the mean particle diameter, which is in the range from 30 to 60 microns. The protein product has been used in cold prepared food emulsions, where it is added to provide emulsification properties and for improving textural attributes, such as grittiness and sandiness. However, whey proteins are expensive to use. Moreover, the whey protein product of Holst must be processed so that the denaturation level is 55-80%. This requires an additional processing step, which also adds to the cost of the product, further making it cost prohibitive.

The energy bars that are currently marketed may provide the healthful nutritional benefits mentioned above, but they do not deliver the taste attributes desired by many consumers leaving them dissatisfied. As a result, some consumers settle on poor taste in order to get the healthful nutritional benefits, while many other consumers choose not to buy energy bars.

What is missing from the marketplace, what food manufacturers have not been able to deliver, is a truly good tasting energy bar that delivers healthful nutritional benefits, i.e. high protein, fortified with vitamins and minerals, and low in fat.

SUMMARY OF THE INVENTION

The present invention is directed to an energy bar having a mean hedonic score for consumer acceptability of at least about 5.2.

In one embodiment, the invention is a grain based energy bar having a mean hedonic score for consumer acceptability of at least about 5.2.

In another embodiment, the invention is a chewy based energy bar having a mean hedonic score for consumer acceptability of at least about 4.9.

In still another embodiment, the invention is an energy bar made by the process comprising the steps of (a) mixing one or more solid components and one or more carbohydrate based syrups to form an energy bar matrix; (b) mixing the energy bar matrix with a fat-carbohydrate matrix to form an enhanced energy bar matrix, wherein the fat-carbohydrate matrix is comprised of at least one fat and at least one carbohydrate component, and (c) forming the enhanced energy bar matrix into the energy bar, wherein the energy bar provides a lubricious mouthfeel.

The present invention also includes a method of making an energy bar comprising the steps of (a) mixing one or more solid components and one or more carbohydrate based syrups to form an energy bar matrix; (b) mixing the energy bar matrix with a fat-carbohydrate matrix to form an enhanced energy bar matrix, wherein the fat-carbohydrate matrix is comprised of at least one fat and at least one carbohydrate component, and (c) forming the enhanced energy bar matrix into the energy bar, wherein the energy bar provides a lubricious mouthfeel.

The present invention also includes a method for improving the mean hedonic score of an energy bar, comprising one or more of the following steps: (a) processing process sensitive ingredients in a manner to preserve the integrity of the process sensitive ingredients by controlling the temperature and/or shear energy imparted on the process sensitive ingredients; (b) strategically positioning physiologically functional ingredients in the energy bar; (c) including a fat-carbohydrate matrix with an energy bar matrix; and (d) using protein powders that have a particle size distribution such that at least about 30 wt. % of the protein powder has a mean particle size of at least about 35 microns.

DETAILED DESCRIPTION OF THE INVENTION

For the purposes of the present invention, energy bars are food products that are shelf stable, in a portable form, and based on a 55 g serving size provide about 2 to about 55 g of carbohydrates, about 0.1 to about 5 g of fortification components (e.g., vitamins, minerals, antioxidants, amino acids, herb supplements, polyphenols, etc.), about 5 to about 40 g of protein, about 2 to about 10 g of fat, about 150 to about 300 calories, having a moisture content of less than about 15% by weight.

For the purposes of the present invention, the use of the term "functional" is understood to mean a physiologically functional component.

For the purposes of the present invention, the use of the term "fortification component" or "fortification blend" or "fortification ingredient" is understood to mean one or more vitamins, minerals, fiber, antioxidants, amino acids, herbal supplements, polyphenols, and the like.

For the purposes of the present invention, the use of the term "energy bar matrix" is understood to mean a thick viscous mixture. The energy bar matrix may start out as a less viscous mixture that becomes more viscous upon the removal of moisture.

For the purposes of the present invention, the use of the term "hedonic score" is understood to mean a measurement of an individual consumer's overall acceptance of a product as a result of the product's combined flavor, texture and appearance properties. The hedonic score is measured on a 7-point "acceptability scale," where a score of 1 is equivalent to a rating of "Dislike Extremely," and 7 is equivalent to a rating of "Like Extremely." The hedonic scores are tabulated and calculated to obtain a statistical average, i.e. mean hedonic score, of the overall consumer acceptance of a product.

For the purposes of the present invention, the use of the term "hedonic gain" is understood to mean the resulting increase in the mean hedonic score as determined by target consumers that has occurred as the result of improvements in the energy bar product through the use of formulation and process methods taught in the present invention. The hedonic gain marks a significant improvement in the overall acceptability of the energy bar when the magnitude of the hedonic gain exceeds the defined confidence interval.

For the purposes of the present invention, the use of the terms "confidence level" and "confidence interval" are understood to mean a statistical probability/certainty based on a set of measurements, that the actual probability of an event or result occurring, is better or greater than some specified level.

The 7-point "Acceptability Scale" is a simple bi-polar scale that ranges from Like Extremely to Dislike Extremely.

Energy bars were first introduced in the marketplace about 20 years ago and now there are over 200 energy bar products available to consumers. Many of the major food companies make energy bars, but none have been able to deliver good tasting energy bars where the mean hedonic score is greater than 5.1 for grain based energy bars or 4.8 for chewy energy bars. At best, they have only been able to deliver healthful nutritional benefits, i.e. high in protein, vitamins and minerals, and low in fat, that consumers expect.

The energy bar of the present invention provides the healthful nutritional benefits that consumers want and expect and delivers them in a surprisingly good tasting product. In fact, consumers who rated the energy bars of the invention, gave it a mean hedonic score of at least about 5.2. This is not an easily achieved combination.

The improved mean hedonic scores are attributed to the processing techniques and inventive components used in manufacturing the energy bars of the present invention. The inventors have discovered that the hedonic score can be improved by (a) processing process sensitive ingredients in a manner to preserve the integrity of the process sensitive ingredients by controlling the temperature and/or shear energy imparted on the process sensitive ingredients; (b) strategically positioning physiologically functional ingredients in the energy bar; (c) including a fat-carbohydrate matrix with the energy bar matrix; and (d) using protein powders that have a particle size distribution such that at least about 30 wt. % of the protein powder has a mean particle size of at least about 35 microns. Incorporating one or more of these techniques will improve the hedonic score of the final energy bar. Conversely, not including one of the above techniques will negatively impact the hedonic score.

Table 1, presents a statistical analysis of the mean hedonic score of the energy bars of the present invention which achieved a score of at least about 5.2 as determined by a consumer taste study performed.

TABLE 1

Energy Bars of the Invention - Confidence Intervals Around the Mean Hedonic Score of 5.2 with N = 75 (Stand. Dev. of 1.33)

| Confidence Interval | Lower Hedonic Limit | Mean Hedonic Score | Upper Hedonic Limit |
|---|---|---|---|
| 99% | 4.84 | 5.20 | 5.56 |
| 95% | 4.90 | 5.20 | 5.50 |
| 90% | 4.95 | 5.20 | 5.45 |
| 80% | 5.07 | 5.20 | 5.33 |
| 70% | 5.12 | 5.20 | 5.28 |
| 60% | 5.16 | 5.20 | 5.24 |

Conventional energy bars that are currently marketed, may deliver nutritional value, but taste attributes have been lacking. This is evident in the consumer taste study that was performed comparing two market leading energy bars, POWERBAR® CHOCOLATE PEANUT BUTTER manufactured by PowerBar Inc. of Berkeley, Calif. and LUNA™ NUTZ OVER CHOCOLATE™ BAR manufactured by Clif Bar Inc. of Berkeley, Calif., to the energy bars of the present invention.

A qualitative product selection study was performed to identify energy bars that have the best overall taste and market performance. A large number of products available in the category were assembled. The products were then compared against an Information Resources Incorporated (IRI) ranking of the top 25 products in the category to ensure that the majority of the category's sales volume was represented in the product sort.

A group of 7 people were put together to review the assortment of products. The products were ranked subjectively by considering flavor, texture, appearance, etc. on a scale of 1 to 10. The top products identified in the ranking were then compared back to the IRI market ranking to ensure that the category's top selling products were represented in the final collection of products. Products in the Top 10 of the sort that were not selected, were later added to the qualitative product selection study.

Two of the top products from the qualitative product selection study and high performing products in each respective market segmentation were then used in a quantitative consumer test study comparing them to the energy bars of the invention. POWERBAR® CHOCOLATE PEANUT BUTTER and the LUNA™ NUTZ OVER CHOCOLATE™ BAR were selected through the screening study, which picked the energy bars that consumers rated highest for taste appeal.

The population of interest, i.e. target consumers, were current users of energy bars, between the ages of 16 and 34 years old, who eat an energy bar on an average of at least once per week. For this particular consumer test study, the consumer's selected had to additionally meet the requirement of being SNICKER'S® Bar users. This added requirement was based on the desire to assure that confectionery users were represented. Moreover, SNICKER'S® Bar users are known to be very particular about product taste.

A screening study was first performed to find energy bar consumers in the target consumer group. Using a questionaire such as the one that follows, individuals meeting the above criteria were selected.

(1) Which of the categories contains your age group?
(a) under 13
(b) 13-15
(c) 16-24
(d) 25-34
(e) 35-45
(f) 46 or older
(2) What is your gender?
(a) male
(b) female
(3) Which, if any, of the following products have you eaten in the past 4 weeks?
(a) potato chips
(b) yogurt
(c) chocolate bars/candy
(d) energy bars/nutrition bars
(e) ice cream
(f) pretzels
(4) What brands of energy/nutrition bars have you eaten in the past 4 weeks?
(a) Balance
(b) Carb Solutions
(c) Clif
(d) Harvest
(e) Luna
(f) Met-Rx
(g) PowerBar
(h) York
(i) Zone
(j) Other: _____ (specify)

A proto-monadic evaluation was performed, where respondents evaluated two or more products, one at a time rather than in a side by side comparison. Each Energy Bar Product was evaluated by a unique group of 75 consumers meeting the requirements for target consumers. The target consumers were selected randomly by calling residents of ten geographically dispersed markets within the US and then they were assigned to the product evaluation groups. Each group of 75 consumers was balanced for demographic variables such as gender, age and geographic location.

In Comparative Examples 1 and 2, and Examples 1, 2, and 3, the results of the consumer taste study are presented where the 75 consumers rated each energy bar on a hedonic scale of 1 to 7. POWERBAR® CHOCOLATE PEANUT BUTTER had a mean hedonic score of about 4.78 and LUNA™ NUTZ OVER CHOCOLATE™ BAR had a mean hedonic score of about 5.06. In contrast, energy bars of the present invention scored higher than the POWERBAR® CHOCOLATE PEANUT BUTTER and the LUNA™ NUTZ OVER CHOCOLATE™ BAR products, with a mean hedonic score of at least 5.2.

The present invention's superiority is further demonstrated when comparing similar type energy bars. For example, chewy energy bars such as POWERBAR® CHOCOLATE PEANUT BUTTER and Inventive Prototype I produced significantly different hedonic scores. The mean hedonic score of Inventive Prototype I, 5.2, is clearly greater than the 4.78 mean hedonic score of POWERBAR® CHOCOLATE PEANUT BUTTER. Moreover, Inventive Prototype II also of the chewy variety, had an even higher mean hedonic score of 5.6, further establishing the taste superiority of the energy bars of the present invention. Likewise, LUNA™ NUTZ OVER CHOCOLATE™ BAR and Inventive Prototype III are both grain based energy bars. Again, the energy bar of the present invention, Inventive Prototype m, had a mean hedonic score of 6.0, which clearly is superior to the 5.06 mean hedonic score of LUNA™ NUTZ OVER CHOCOLATE™ BAR. Consumers hedonically rated the energy bars of the invention much higher than these top rated energy bars.

A mean hedonic score of at least about 5.2 was obtained for the energy bars of the present invention. In a particularly preferred embodiment, a chewy energy bar that included a fat-carbohydrate matrix-Inventive Prototype II, received a mean hedonic score of about 5.6. In another preferred embodiment, a grain based energy bar of the present invention had a mean hedonic score of about 6.0, which is much higher than any previously made energy bar. Each energy bar product of the invention clearly demonstrated a significant improvement in taste by the consumers' overall rating of the product.

In a preferred embodiment, energy bars of the present invention had a mean hedonic score of at least about 5.3. More preferably, a mean hedonic score of at least about 5.4, even more preferably, a mean hedonic score of at least about 5.5, still even more preferably, a mean hedonic score of at least about 5.6, and most preferably, a mean hedonic score of at least about 5.7. The energy bar of the invention is a grain based energy bar or a chewy energy bar. In one embodiment, the energy bar of the present invention is a chewy energy bar that has a mean hedonic score for consumer acceptability of at least about 4.9. Preferably, the chewy energy bar has a mean hedonic score of at least about 5.0, more preferably, at least about 5.1, and even more preferably about 5.2. In another preferred embodiment, the present invention is a grain based energy bar that has a mean hedonic score for consumer acceptability of at least about 5.2.

In order to determine the mean hedonic score for a particular product, the particular product is compared to one or more category market leading products, which are identified through retail sales volume, and participants are asked to answer the following question for the particular product and the comparative category market leading products.

How much do you LIKE or DISLIKE this product OVERALL?

| Check One |
|---|
| _____ 7 Like extremely |
| _____ 6 Like very much |
| _____ 5 Like slightly |
| _____ 4 Neither like nor dislike |
| _____ 3 Dislike slightly |
| _____ 2 Dislike very much |
| _____ 1 Dislike extremely |

The mean hedonic score for a particular energy bar is calculated using a statistical software program available from companies such as SAS, Inc. or SPSS, Inc.

The inventors recognize that the hedonic score is greatly determined by a product's taste and texture, and have advantageously designed the energy bars of the present invention in such a way to minimize processing effects that would negatively affect these attributes. The result is an energy bar that has a mean hedonic score higher than existing energy bars. In addition, the inventors have also included components that enhance the flavor and textural attributes of the energy bars of the invention, further increasing the mean hedonic scores.

It is desirable that the energy bar of the invention have the following composition, based on a 55 g serving size. Carbohydrates: The amount of carbohydrates in the energy bar of the invention is preferably about 2 g to about 55 g. More preferably, about 10 g to about 50 g, even more preferably, about 15 g to about 45 g, and most preferably, about 20 g to about 40 g, are carbohydrates. Fortification components: The amount of fortification components in the energy bar of the invention is preferably about 0.1 g to about 5 g. More preferably, about 1 g to about 4.5 g, and most preferably, about 2 g to about 4 g, are fortification components. Protein: The amount of protein in the energy bar of the invention is preferably about 5 g to about 40 g. More preferably, about 6 g to about 35 g, even more preferably, about 8 g to about 30 g, and most preferably, about 10 g to about 25 g, are proteins. Fat: The amount of fat in the energy bar of the invention is preferably about 2 g to about 10 g. More preferably, about 3 g to about 8 g, and most preferably, about 4 g to about 7 g, are fats. Calories: The amount of calories in the energy bar of the invention is preferably about 150 cal to about 300 cal. More preferably, about 170 cal to about 280 cal, even more preferably, about 200 cal to about 260 cal, and most preferably, about 220 cal to about 240 cal, are calories. Moisture content: The moisture content in the energy bar of the invention is preferably less than about 15%. More preferably, about 3% to about 12%, even more preferably, about 5% to about 10%, and most preferably, about 7% to about 9%, by weight is moisture.

The energy bar of the present invention is comprised of one or more solid components and one or more carbohydrate based syrups, which form an energy bar matrix.

The solid components may be, for example, corn starch, oat, rice, wheat, barley, cereal, grains, sorghum, protein, salt, flavors, cocoa powder, flour, fortification blends, mixtures thereof, and other similar materials. Moreover, the solid components include dissolved solids such as sugars, salts, and the like, and may be in the form of powders or large particles. The preferred solid component is protein.

The solid components are included, for example, in the grain based and chewy energy bars of the invention at about 10 percent by weight (wt. %) to about 97 wt. % based on the total weight of the energy bar. Preferably, the solid components are from about 75 wt. % to about 95 wt. %, more preferably, from about 85 wt. % to about 92 wt. %, and most preferably, from about 90 wt. % to about 91.5 wt. %, based on the total weight of the energy bar.

Carbohydrate based syrups include, but are not limited to corn syrups, liquid sucrose, honey, high fructose corn syrup, glycerin, and mixtures thereof.

About 3 wt. % to about 90 wt. % of the total weight of the energy bar, is made up of the carbohydrate based syrup. Preferably, the carbohydrate based syrup is from about 10 wt. % to about 75 wt. %, more preferably, from about 15 wt. % to about 65 wt. %, and most preferably from about 20 wt. % to about 50 wt. % of the total weight of the energy bar.

The solid components and carbohydrate based syrups are combined to form an energy bar matrix. Various mixing means may be used, however, the product design will ultimately determine what type of mixing is required. For example, if the energy bar will be a homogeneous mass, then high shear mixing may be appropriate. Alternatively, if the energy bar has fragile components that should desirably remain intact, then gentle or low shear mixing would be used.

Additionally, the energy bar may include a fat-carbohydrate matrix. The fat-carbohydrate matrix may be added to the energy bar matrix to coat or blend in with the energy bar matrix. Preferably, the fat-carbohydrate matrix is incorporated with the energy bar matrix through gentle and low shear mixing, such as by gently folding one matrix into the other, which is a method known in the art. It is desirable that the mixer fold in the fat-carbohydrate matrix into the energy bar matrix, until there are no visible clumps of the fat-carbohydrate matrix. Suitable mixers include, for example, paddle mixers, ribbon blenders, Z-blade mixers and the like may be used. In addition, the fat-carbohydrate matrix should be combined with the energy bar matrix at a temperature of less than about 65° C.

The fat-carbohydrate matrix is comprised of at least one fat component and at least one carbohydrate component, which are mixed together in a suitable fashion to achieve a homogeneous mixture. Fat components include, but are not limited to, chocolate, peanut butter, fat substitutes, vegetable fats, tropical fats, animal fats, dairy/milk and the like. The carbohydrate component may be, for example, starch, sugar, gels, syrups, honey, molasses, rice syrups, and combinations thereof. The fat-carbohydrate matrix will generally comprise from about 2 wt. % to about 25 wt. % of one or more fat components, preferably, from about 5 wt. % to about 20 wt. %, and most preferably from about 10 wt. % to about 15 wt. % based on the total weight of the fat-carbohydrate matrix prior to cooking or further processing. The one or more carbohydrate components in the fat-carbohydrate matrix will be from about 10 wt. % to about 75 wt. %, preferably, from about 20 wt. % to about 65 wt. %, more preferably from about 30 wt. % to about 55 wt. %, and most preferably, from about 40 wt. % to about 50 wt. % based on the total weight of the fat-carbohydrate matrix prior to cooking or further processing.

The amount of the fat-carbohydrate matrix that is combined with the energy bar matrix is such that the ratio of the energy bar matrix to fat-carbohydrate matrix, is about 99:1 to about 80:20. Preferably, the ratio is about 95:5 to about 85:15. Most preferably the energy bar matrix to fat-carbohydrate matrix ratio is about 90:10.

Preferably, the fat-carbohydrate matrix is caramel, fondants, truffles, creams, ganache, mousse, chocolate, and mixtures thereof. In a preferred embodiment, the fat-carbohydrate matrix is caramel. Caramel is made by mixing at least one fat component and at least one carbohydrate component to create a premix. A preferred caramel premix composition comprises from about 5 wt. % to about 15 wt. % of vegetable fat, more preferably, from about 7 wt. % to about 14 wt. %, and most preferably, from about 10 wt. % to about 13 wt. % of vegetable fat in the caramel premix. A preferred carbohydrate for the caramel premix is corn syrup. The corn syrup in the caramel premix is preferably present in a range of about 25 wt. % to about 60 wt. %, more preferably, from about 35 wt. % to about 50 wt. %, and most preferably, from about 40 wt. % to about 48 wt. % of corn syrup in the caramel premix. The caramel premix is then cooked using any suitable means, e.g., using a scraped surface heat exchanger or jacketed mixing kettle, to form a caramel having a viscosity of up to about 250,000 cps, preferably about 100,000 cps to about 200,000 cps, a moisture content of about 7 wt. % to about 15 wt. %, more preferably about 10 wt. % to about 13 wt. %, most preferably about 11 wt. % to about 12 wt. %, and a water activity of about 0.45 to about 0.65, more preferably about 0.5 to about 0.6, most preferably about 0.51 to about 0.58. Note that the actual cooking time will affect the flavor, color, and texture of the caramel.

The caramel is cooled to a temperature of less than about 65° C. and then combined with the energy bar matrix. The two are blended together, forming an enhanced energy bar matrix. At this point, the enhanced energy bar matrix can be (a) formed or shaped into an energy bar; (b) mixed with other components, such as inclusions; (c) formed into a sheet or layer that can be combined with other ingredients or other layers.

Conventional energy bars take an energy bar matrix comprised of solid components and a binder, and proceed to a forming step.

In the energy bar of the present invention, a binder is optionally included in the grain based energy bar formulation. The binder may supplement or be added in addition to the carbohydrate based syrups. The binder is typically applied to the solid components to create or increase the tackiness and/or stickiness of the surface of the solid components, so that they will adhere to other similar or dissimilar components, when necessary. Suitable binders include, but are not limited to, fat, a gum solution, water, and combinations thereof.

The binder may be present in an amount of from about 10 wt. % to about 90 wt. % based on the total weight of the energy bar. Preferably, the binder is from about 30 wt. % to about 70 wt. % of the total weight of the energy bar.

Numerous methods and apparatus may be used to mix or combine components and intermediaries. So long as the mixing device is able to satisfactorily form a mixture that avoids high shear and imparts minimal heat energy, the mixer can be used. A sampling of such mixing devices includes but is not limited to, for example, mixing kettles and vessels, extruders, paddle mixers, ribbon blenders, mixing pans, processors, Z-blade mixers, dough mixers, planetary mixers, and the like can all be used.

Various methods and apparatus may be employed to form the energy bar. For example, the energy product matrix or enhanced energy product matrix may be formed into a slab that is later cut and shaped into smaller pieces. Or individual pieces may be made by employing a molding operation. Or a forming roll maybe used to create discrete pieces. Or an extruder may be used to extrude the product through a shaped die.

One method that may be used to shape the energy product matrix or enhanced energy product matrix is to use a cutting apparatus, especially when the final energy product matrix or enhanced energy product matrix takes the form of a bar. For example, a slitter, guillotine, wirecutter, forming roll, extruder, stamper, molder, and the like can be used.

Optionally, additional processing steps may be incorporated. For example, the solid components may be treated to a roasting step to develop or impart flavor notes. This is particularly true when granola, grains, nuts, or crisps such as rice or soy are used in the formulation. Roasting is performed in an oven such as a convection oven, a forced air impingement oven, dielectric oven, microwave oven, radiant oven, and the like. The temperature and time in the oven is largely dependent upon the component being treated.

Components or intermediate products may be cooked using any suitable means. For example, in processing the binder, the binder may be cooked using a scraped surface heat exchanger (SSHE). The product is cooked in the SSHE at a temperature of about 105° C. to about 135° C. for a time period of about 3 seconds to about 60 seconds.

A drying step may be used to reduce the moisture content of the product for improving shelf stability. Various drying techniques include, oven drying, forced air, vacuum drying, freeze drying, and the like.

The product may be cooled to solidify its shape or to prepare the product for the next unit operation. Typically, cooling is performed in an enclosed chamber, such as a cooling tunnel.

The inventors have discovered that the manner in which components are processed in the energy bar may have a significant impact on the hedonic score. By using the inventive components and processing techniques disclosed herein, the hedonic score of the final energy bar can be improved significantly beyond the hedonic scores known for existing energy bars.

One method of improving the hedonic score of an energy bar of the present invention is to process it in a manner that substantially preserves and maintains the integrity of process sensitive components. This is largely achieved by controlling the temperature and/or shear energy that is imparted on the process sensitive components. Not doing so will negatively impact the hedonic score of the resulting product. For example, exposure of ingredients to high processing temperatures will impact the taste of the ingredients, perhaps burning or overcooking them.

Process sensitive components are those components that are negatively affected by harsh process conditions. They include, but are not limited to, fortification components, friable components, flavor components, shear sensitive inclusion components, heat sensitive ingredients, and the like. Vitamins, minerals, antioxidants, amino acids, essential oils, herbals, and polyphenols are non-limiting examples of the fortification component. Friable and shear sensitive components include, but are not limited to, soy crisps, rice crisps, cookies, nut meats, baked inclusions, filed inclusions, roasted inclusions, extruded food inclusions, encapsulated components, and the like. Flavor components are, for example, vanilla, butter, cinnamon, nutmeg, spices, whole grains, grain flakes, natural and artificial flavors, and the like.

The preferred vitamins are for example, vitamin A, vitamin C, vitamin D, vitamin E, vitamin K, and their derivatives and/or pro-vitamins. Preferred vitamins also include B vitamins such as, for example, biotin, folic acid, niacin, niacinamide, pantothenate, pyridoxine hydrochloride, riboflavin, thiamin hydrochloride, and the like. The preferred minerals include but are not limited to bromine, calcium, chromium, copper, iodine, iron, magnesium, manganese, phosphates, phosphorus, potassium, selenium, sodium, sulfur, and zinc.

Amino acids include, for example, arginine, histidine, isoleucine, leucine, lysine, methionine, phenylalanine, threonine, tryptophan, valine, alanine, aspartic acid, glutamic acid, glutamine, glycine, serine, tyrosine, creatine, and the like. Moreover, phytochemicals, sterols, lycopine, herbal supplements such as ginseng, guarana, yerba mate, and the like may be included.

The inventors have discovered that by controlling the temperature and shear energy imparted on a process sensitive component, harmful and deleterious effects on the process sensitive component can be reduced or minimized. For example, a homogeneous energy product matrix is formed by processing one or more food components. The processing step is performed at a temperature and shear sufficient to form the homogeneous energy product matrix, while minimizing the detrimental effects of processing. Typically, the processing step is performed at a temperature from about 50° C. to about 180° C. Preferably, from about 60° C. to about 120° C., and more preferably, from about 60° C. to about 100° C.

Shear forces originating from mixing, extruding, pumping, cutting, particle size reduction operations, and the like, may be used to form the homogeneous energy product matrix. The shear forces are preferably generated during a mixing operation. The mixer should have an agitator, where the agitator is capable of generating an agitator tip speed (relative to a wall of the mixer) of about 10 to about 50 meters/minute. In a preferred embodiment, the agitator tip speed is about 20 to about 40 meters/minute. Consideration should also be given to the gap formed between the agitator tip to the mixer wall. The gap should be from about 0.025 to about 0.5 mm. Preferably from about 0.125 to about 0.25 mm.

Additional shear forces may be encountered by transporting the in-process product through process piping, valves, strainers, filters, and the like.

Selection of the mixing device should also be given careful consideration. The mixing device should be selected such that the shearing action imparted on the process sensitive component is sufficient to mix the process sensitive component into the homogeneous energy bar matrix without affecting the process sensitive component in a deleterious way. Suitable mixers include, but are not limited to, mixers with an agitator, mixers without an agitator, static mixers, paddle blenders, ribbon blenders, and the like. When mixing is performed in a mixer with an agitator, shear forces are usually minimized by operating the agitator at a low speed, such that the tip speed of the agitator is about 0.25 to about 7.5 meters/minute (relative to a wall of the mixer). Preferably, the agitator tip speed is about 2 to about 6 meters/minute. Shear forces are also influenced by the gap between the tip of the agitator and the mixer wall. The gap is desirably set to be greater than about 1.0 mm, preferably, greater than about 2.5 mm, and more preferably, between about 2.5 to about 75 mm. In one embodiment, mixing is performed in a continuous fashion.

The temperature of the mixing step can also have an effect on the process sensitive component. Generally, in order to substantially reduce deleterious effects, mixing should be performed at a temperature that is less than about 65° C. Preferably, the temperature is less than about 60° C., and more preferably, less than about 50° C. In one embodiment, the mixing step is performed at a temperature of from about 30° C. to about 50° C.

Moreover, the preservation of the process sensitive components may be also improved by (a) strategically positioning them in the energy bar product and/or (b) adding them to the energy bar after performing process steps that involve heating or shearing of the product. For example, process sensitive components may be added to a fat matrix, which surrounds the process sensitive components and forms a protective barrier.

Additional information may be found in U.S. patent application Ser. No. 10/271,710 which is titled "Preservation of Process Sensitive Ingredients in an Energy Food Product by Product Partitioning," the contents of which are incorporated by reference.

Hedonic score advantages may also be obtained by cleverly and strategically positioning physiologically functional components in certain areas of the bar. This improves the taste of the energy bar by factoring in the taste impact of the physiologically functional components and designing the bar to minimize or neutralize their effects. By not putting them in strategic areas, negative tasting components will be spread throughout the energy bar, impacting the whole taste of the bar.

The physiologically functional component is a component that provides a physiological benefit, such as providing nutrients. Suitable physiologically functional components include, but are not limited to, vitamins, minerals, fiber, antioxidants, herbal supplements, polyphenols, and the like. The vitamins and/or minerals can also be fat soluble and/or water soluble. In addition, the physiologically functional component can also be an amino acid, enzyme, and the like.

The inventors have identified a group of approaches to advantageously position the physiological functional component in the energy bar. In one method, the physiological functional component may be applied to the surface of a food substrate, e.g., energy bar matrix layer, and then substantially covered by a flowable edible material. In another method a first flowable edible material is applied to the surface of a food substrate. Then the functional component is applied onto the surface of the first flowable edible material. This is followed by applying a second flowable edible material to substantially cover the functional component. The first flowable edible material may be the same material or a different material from the second flowable edible material. A third technique combines a flowable edible material and a functional component to create a homogenous mixture. The homogenous mixture is then applied to a surface of a food substrate.

Various techniques may be used to apply the functional component onto the food substrate or first flowable edible material. Suitable methods include slabbing (applying a layer), spraying, gravity deposition, electrostatic deposition, and the like. These methods are particularly preferred when the functional component is in powder form.

The flowable edible material is primarily used to trap, cover, or encase the functional component. In certain instances, the fat-carbohydrate matrix performs the same function and may be used as the flowable edible material. Non-limiting examples of the flowable edible materials, e.g., first or second flowable edible materials, are fat based materials such as compound coatings or chocolate, syrups, film-forming edible barriers, and the like. Syrups that are suitable for use, include, carbohydrate based syrups such as sucrose syrup, corn syrup, caramel, and the like. Film-forming edible barriers include, for example, carboxy methyl cellulose, alginate, and the like.

Enrobing, panning, extruding, spraying, depositing, and any other suitable technique may be used for applying the flowable edible material or homogeneous mixture.

Additional information may be found in U.S. patent application Ser. No. 10/272,618 which is titled "Method for Preparing an Energy Food Product Having a Physiological Functional Ingredient," the contents of which are incorporated by reference.

One primary ingredient in almost every energy bar is protein. It provides nutrients that help with the growth and repair of body tissues. For adults, many dietary guidelines recommend that a person consume approximately 0.6 g of protein per kilogram of body weight per day. Higher levels are recommended for individuals that are more physically active. In addition, protein can be used as a source of energy. One gram of protein provides about 4 kcal of energy. The protein based substrate includes, but is not limited to, whey protein, milk protein, egg protein, casein, peanut flour, nut meats, vegetable protein, and combinations thereof. Vegetable proteins include, for example, soy protein, peanut protein, hazelnut protein, and the like.

One source of protein that is almost always included for the above mentioned reasons in the formulation of energy bar products is protein powder. But, the addition of a protein powder has a negative impact on taste attributes, such as product mouthfeel, which ultimately affects the hedonic score of the energy bar.

A dry powder such as a protein powder, is typically comprised of particles of varying size. The inventors have discovered that by engineering the mean particle diameter of a protein powder, such as a commercial protein powder, exceptional and surprising properties can be achieved. For example, improved mouthfeel and lubricity is obtained by using protein powders where at least about 30 wt. % of the protein powder has a mean particle size of at least about 35 microns. Preferably, at least about 40 wt. % of the protein powder should meet the mean particle diameter requirements. More preferably at least about 50 wt. %, even more preferably at least about 60 wt. %, even more preferably at least about 70 wt. %, and most preferably at least about 80 wt. % should meet the mean particle diameter requirements. In a particular embodiment, about 50 wt. % to about 100 wt. % of the protein powder should meet the mean particle diameter requirements. In another embodiment, about 75 wt. % to about 100 wt. %, more preferably about 85 wt. % to about 100 wt. % should meet the mean particle diameter requirements. Preferably, the mean particle diameter of the engineered protein powder is at least about 55 microns, more preferably at least about 70 microns, and even more preferably at least about 100 microns. In a preferred embodiment, the mean particle diameter is about 35 microns to about 175 microns, more preferably about 40 microns to about 150 microns, even more preferably about 40 microns to about 100 microns, even more preferably about 40 microns to about 80 microns, and most preferably about 50 microns to about 70 microns.

In one embodiment, the protein powder that is used has a particle size distribution such that at least 50% of the particles have a mean particle diameter in the range from about 35 to about 175 microns; less than 10% of the particles have a mean particle diameter in the range from about 10 to about 50 microns; less than 25% of the particles have a mean particle diameter in the range from about 20 to about 80 microns; less than 50% of the particles have a mean particle diameter in the range from about 30 to about 100 microns; less than 75% of the particles have a mean particle diameter in the range from about 45 to about 150 microns; and less than 90% of the particles have a mean particle diameter in the range from about 62 to about 250 microns.

In a particularly preferred embodiment, less than about 20 wt. % of the protein powder has a mean particle diameter of less than about 20 microns and less than about 10 wt. % of the protein powder has a mean particle diameter of less than about 10 microns.

An energy bar manufactured using an engineered protein powder (such as those described above) would see an improvement in the mean hedonic score. For example, using an engineered protein powder in a chewy energy bar such as Inventive Prototype II, the mean hedonic score should improve to 5.7 at a 60% confidence interval, preferably 5.7 at a 70% confidence interval, more preferably 5.7 at an 80% confidence interval, still more preferably 5.7 at a 90% confidence interval, still even more preferably 5.7 at a 95% confidence interval, and most preferably 5.7 at a 99% confidence interval.

Preferably the mean hedonic score should improve to 5.75 at a 60% confidence interval, preferably 5.75 at a 70% confidence interval, more preferably 5.75 at an 80% confidence interval, still more preferably 5.75 at a 90% confidence interval, still even more preferably 5.75 at a 95% confidence interval, and most preferably 5.75 at a 99% confidence interval.

More preferably the mean hedonic score should improve to 5.8 at a 60% confidence interval, preferably 5.8 at a 70% confidence interval, more preferably 5.8 at an 80% confidence interval, still more preferably 5.8 at a 90% confidence interval, still even more preferably 5.8 at a 95% confidence interval, and most preferably 5.8 at a 99% confidence interval.

Still more preferably the mean hedonic score should improve to 5.85 at a 60% confidence interval, preferably 5.85 at a 70% confidence interval, more preferably 5.85 at an 80% confidence interval, still more preferably 5.85 at a 90% confidence interval, still even more preferably 5.85 at a 95% confidence interval, and most preferably 5.85 at a 99% confidence interval.

Still even more preferably the mean hedonic score should improve to 5.9 at a 60% confidence interval, preferably 5.9 at a 70% confidence interval, more preferably 5.9 at an 80% confidence interval, still more preferably 5.9 at a 90% confidence interval, still even more preferably 5.9 at a 95% confidence interval, and most preferably 5.9 at a 99% confidence interval.

Most preferably the mean hedonic score should improve to 5.95 at a 60% confidence interval, preferably 5.95 at a 70% confidence interval, more preferably 5.95 at an 80% confidence interval, still more preferably 5.95 at a 90% confidence interval, still even more preferably 5.95 at a 95% confidence interval, and most preferably 5.95 at a 99% confidence interval.

In another example, using an engineered protein powder in a grain based energy bar such as Inventive Prototype III, the mean hedonic score should improve to 6.04 at a 60% confidence interval, preferably 6.04 at a 70% confidence interval, more preferably 6.04 at an 80% confidence interval, still more preferably 6.04 at a 90% confidence interval, still even more preferably 6.04 at a 95% confidence interval, and most preferably 6.04 at a 99% confidence interval.

Preferably the mean hedonic score should improve to 6.07 at a 60% confidence interval, preferably 6.07 at a 70% confidence interval, more preferably 6.07 at an 80% confidence interval, still more preferably 6.07 at a 90% confidence interval, still even more preferably 6.07 at a 95% confidence interval, and most preferably 6.07 at a 99% confidence interval.

More preferably the mean hedonic score should improve to 6.1 at a 60% confidence interval, preferably 6.1 at a 70% confidence interval, more preferably 6.1 at an 80% confidence interval, still more preferably 6.1 at a 90% confidence interval, still even more preferably 6.1 at a 95% confidence interval, and most preferably 6.1 at a 99% confidence interval.

Still more preferably the mean hedonic score should improve to 6.12 at a 60% confidence interval, preferably 6.12 at a 70% confidence interval, more preferably 6.12 at an 80% confidence interval, still more preferably 6.12 at a 90% confidence interval, still even more preferably 6.12 at a 95% confidence interval, and most preferably 6.12 at a 99% confidence interval.

Most preferably the mean hedonic score should improve to 6.15 at a 60% confidence interval, preferably 6.15 at a 70% confidence interval, more preferably 6.15 at an 80% confidence interval, still more preferably 6.15 at a 90% confidence interval, still even more preferably 6.15 at a 95% confidence interval, and most preferably 6.15 at a 99% confidence interval.

Note that in the two previous examples, the statistical analysis is based on a sample size of 75 participants, with a standard deviation of 1.2.

The protein powder can be engineered to the desired mean particle diameter using any suitable means. For example, equipment such as air classifiers, sieves, spray dryers, agglomerators, or hydraulic presses may be used.

The engineered protein powder can be made by treating a commercial protein powder in a particle enhancement process. The particle enhancement process, may be, air classification, sieve classification, spray drying, agglomeration, rehydration, high pressure co-crystallization, and combinations thereof.

A particularly effective means for separating the protein powder into the desired mean particle diameter range and/or distribution is through the use of an air classification system. Forced air in combination with centrifugal forces are used to separate dry powder products into light fractions and heavy fractions, or a fraction above and a fraction below a defined "cut" point. This effectively separates the protein powder particles into different ranges according to their size and density.

Alternatively, protein powders may be engineered to the desired mean particle diameter by increasing the mean particle diameter size using a variety of processing methods. For example, suitable processes that may be employed include spray drying, agglomeration, rehydration, high pressure co-crystallization, and the like.

In a spray drying operation, the protein is hydrated or rehydrated and forced through a nozzle at high pressure to form an atomized spray. The desired mean particle diameter protein powder is produced by controlling process variables, such as temperature, nozzle size and shape, and other dryer column characteristics.

Agglomeration techniques are often used to bring particles together to create larger ones. An atomized mist of a binder solution or appropriate liquid is dispersed over a fluidized bed of a protein powder, to promote agglomeration. This process differs from spray drying in the sense that it involves the formation of a primary particle of a given mean diameter whereas spray drying involves the formation of a bound group of particles having the desired mean particle diameter. With agglomeration, the particle can be one particle or a group of bound particles.

Rehydration techniques involve completely wetting all particles of a protein powder and forming a homogeneous energy bar matrix, e.g., paste, thereby rehydrating the protein powder. The resulting mass is then vacuum dried or dried using any other appropriate method to insure complete removal of residual moisture. The stiff material that results is then milled to the desired particle size.

High pressure co-crystallization relies on a morphological interaction between proteins and another ingredient in order to create a bridge between two protein particles. Such an interaction can be created by making a dry mix of two or more powder ingredients and then subjecting them to high pressures. The resulting bricks or solid masses of the co-crystallized material can then be milled to the desired particle size.

Suitable protein sources include animal proteins and plant proteins. Non-limiting examples include, whey protein, soy protein, milk protein, egg protein, casein, peanut flour, nut meats, and combinations thereof.

Soy protein is extracted from soybean and is considered to be an economical protein source. The most popular types of soy protein are soy protein isolates and soy protein concentrates. Soy protein isolates are highly digestible and a good source of amino acids and isoflavones. In addition, they are low in fat, calories, and cholesterol. For vegetarians, this is a primary source of protein.

Whey protein is derived from whey, which is a by product obtained from making cheese. Functionally, whey proteins are highly soluble even under acidic conditions. There are primarily two forms of whey protein, whey protein isolate and whey protein concentrate. Both are extremely high quality proteins that are highly digestible. However, whey protein isolate is somewhat superior because it is higher in protein and has lower fat, lactose, and flavor levels than whey protein concentrate.

Casein is the primary protein found in milk protein, which is about 80% casein and 20% whey protein. Casein includes caseinates, which are available in three main types, sodium, calcium, and potassium.

Spray dried egg whites are used in some "egg and milk" protein powder mixes.

Additional information may be found in U.S. Provisional Patent Application Ser. No. 60/394,672 which is titled "Particle Size Enhancement of Protein Powders," the contents of which are incorporated by reference.

In addition, hedonic score advantages may be obtained by using inclusions, which are formulated to have at least one physiologically functional component. The inclusions are dispersed throughout or spread onto a surface of the energy bar. The inclusions provide a means for isolating or concentrating the delivery of physiologically functional components. This allows energy food products to be designed in a way that has several benefits. One benefit is that the inclusion may be formulated with the physiologically functional component to improve taste characteristics. For example, a physiologically functional component may have an unpleasant or undesirable taste, which can be neutralized by masking the taste. Moreover, the inclusion will have its own unique taste, which is different from the rest of the energy bar. Thus, providing the consumer with a wider range of taste sensations. Another benefit is that the inclusion may be formulated to improve the oxidative stability of the physiologically functional component, which by itself may present stability issues. Yet another benefit is that one or more process sensitive components, e.g., components that degrade under exposure to heat and/or shear, may be incorporated into the inclusions, which provides a protective matrix around the process sensitive components. The inclusions can be added at any time during processing, which allows more flexibility in the process and reduces the temperature effects and/or shear effects that could cause degradation of the process sensitive components. Still yet another benefit is that the inclusions can be formulated in such a way as to provide desirable textural attributes. For example, the inclusions may be formulated to provide a crunchy textural feel. The inclusions have at least one physiologically functional component and may be, for example, fat-based inclusions, carbohydrate-based inclusions, protein based inclusions, and the like.

The fat-based inclusions are characterized by having fat as the continuous phase. Non-limiting examples of fat-based inclusions include, chocolate, peanut butter, fat substitutes, and the like. Preferred fat-based inclusions are chocolate chips, peanut butter chips, and combinations thereof.

The protein-based inclusions of the present invention are at least about 25 wt. % protein. Non-limiting examples include, whey protein, soy protein, milk protein, egg protein, peanut flour, nut meats, vegetable protein, casein, and combinations thereof.

The carbohydrate-based inclusions of the present invention are at least about 25 wt. % carbohydrate. Non-limiting examples include, starch, sugar, gels, and combinations thereof. Moreover, the carbohydrate-based inclusions are preferably, panned inclusions, extruded gel pieces, friable carbohydrate pieces, sugar bits, extruded grain flour pieces and combinations thereof.

The inclusions maybe, for example, agglomerates, capsules, compilations of ingredients, chunks, bits, drops, strands, strings, and the like. They may take on a variety of shapes, so long as the average particle size of the inclusions are from about 1 mm to about 13 mm. The preferred average particle size is from about 1 mm to about 6 mm.

In addition, it is contemplated that the inclusions of the present invention may be different from one another. That is, it is not necessary that the inclusions be the same. For example, the energy bar may contain inclusions that are fat-based inclusions and inclusions that are carbohydrate-based inclusions.

Optionally, the inclusions may be coated with a sugar syrup, hard fat, starch solution, or gum solution. The coating may be applied using any suitable means. For example, the coating may be applied by panning, spraying, dipping, enrobing, fluidized bed techniques, and the like.

Additional information may be found in U.S. patent application Ser. No. 10/272,571 which is titled "Energy Food Product Comprised of Inclusions Containing Physiological Functional Ingredients," the contents of which are incorporated by reference.

The energy bars of the present invention are desirably shelf stable. Product stability and shelf life may be enhanced by designing the energy bars so that the total moisture content is less than about 15 wt. %, and preferably from about 3 wt. % to about 12 wt. %, based upon the total weight of the energy bar. More preferably, about 5% to about 10%, and most preferably, about 7% to about 9%, by weight is moisture. The water activity of the energy bar is ideally less than about 0.6, and preferably less than about 0.5.

Optionally, the energy bar of the present invention may include a variety of other components such as, for example, nuts, crisps, fruit pieces, chocolate, seeds, and the like. Preferred nuts are almonds, peanuts, hazelnuts, cashews, walnuts, pecans, brazil nuts, and the like. Crisp components include rice crisps, corn crisps, oats, wheat flakes, and the like. The chocolate can be any type of chocolate or chocolate like edible component in various forms, such as, for example, chocolate chips, chunks, flakes and the like. Non-limiting examples of seeds include sesame, sun flower, poppy, caraway, fennel and the like.

Additionally, traditional food ingredients such as flavors and the like may be included. For example, additional ingredients may include natural and artificial flavors, sweeteners, salt, flavor enhancers, color additives, emulsifiers, stabilizers, fats, preservatives, and the like.

The energy bar may take on a variety of forms. For convenience, it is preferred that the energy food product be shaped like a box, square, cylinder, string, pie, sphere, triangle, or other portable format.

The present invention also includes a method for making an energy bar. The method comprises the steps of (a) mixing one or more solid components and one or more carbohydrate based syrups to form an energy bar matrix; (b) mixing the energy bar matrix with a fat-carbohydrate matrix to form an enhanced energy bar matrix, wherein the fat-carbohydrate matrix is comprised of at least one fat and at least one carbohydrate component, and (c) forming the enhanced energy bar matrix into the energy bar.

In step (a), mixing may be accomplished using any suitable means that will ensure that the solid component and carbohydrate based syrup are properly blended. Preferred methods of mixing are described above.

In step (b), mixing of the energy bar matrix with the fat-carbohydrate matrix is typically performed using a gentle, low shear mixing process that folds the components together. The mixing should continue until there are no visible identifiable pieces of the fat-carbohydrate matrix remaining. Once this occurs, mixing should be stopped. For example, a 136 kg batch mixed in an 11 cu.ft. Z-blade mixer would require about 45 seconds of mixing time with the mixer operating at about 45 rpm.

The forming step, step (c), can involve many different processes. For example, forming the enhanced energy bar matrix into an energy bar can be accomplished using methods previously described. The process selected will depend on the desired product design requirements.

An energy bar manufactured using any one of the inventive methods described herein will exhibit certain product advantages. For example, product mouthfeel will improve, characterized by an increase in lubricity, smoother texture, and reduced grittiness. In addition, following the method will reduce the impact of undesirable flavors.

Moreover, the present invention can be used to improve the mean hedonic score of an energy bar, by following one or more of the following steps: (a) processing process sensitive ingredients in a manner to preserve the integrity of the process sensitive ingredients by controlling the temperature and/or shear energy imparted on the process sensitive ingredients; (b) strategically positioning physiologically functional ingredients in the energy bar; (c) including a fat-carbohydrate matrix with an energy bar matrix; and (d) using protein powders that have a particle size distribution such that at least about 30 wt. % of the protein powder has a mean particle size of at least about 35 microns. The inventive techniques of this invention can be applied to any energy bar formulation. Each inventive technique, whether processing or formulation related will result in an improvement in the mean hedonic score. The hedonic gain is a measure of the resulting improvement. By practicing any one of the inventive techniques, the energy bar product will have a hedonic gain of at least about 0.2 points. By practicing more than one of the inventive techniques, a hedonic gain of at least 0.4 points is expected. For example, an energy bar composition containing process sensitive ingredients is processed in a manner that controls the temperature and shear energy imparted on the process sensitive ingredients at levels that minimize processing effects. The integrity of the process sensitive ingredients is preserved and the expected hedonic gain is about 0.4 points. In another example, an energy bar matrix is processed in a manner that controls the temperature and shear energy imparted on process sensitive ingredients, preserving the integrity of the process sensitive ingredients. In addition, a fat-carbohydrate matrix is combined with the energy bar matrix. The expected hedonic gain is about 0.6 points.

As noted above, one or more of the inventive techniques can be applied to any energy bar formulation. A preferred energy bar is comprised of about 22 wt. % to about 31 wt. % of one or more carbohydrate based syrups, about 23 wt. % to about 35 wt. % of one or more proteins, and about 2 wt. % to about 4 wt. % of a fortification blend, based on the total weight of the energy bar. Another preferred energy bar composition is comprised of about 20 wt. % to about 26 wt. % of one or more carbohydrate based syrups, about 18 wt. % to about 26 wt. % of one or more proteins, about 2.5 wt. % to about 6.0 wt. % of a fortification blend, and about 4.5 wt. % to about 8.0 wt. % of a fat-carbohydrate matrix, based on the total weight of the energy bar. Yet another preferred energy bar composition is comprised of about 29 wt. % to about 35 wt. % of one or more carbohydrate based syrups, about 14 wt. % to about 17 wt. % of one or more grain components, about 19 wt. % to about 26 wt. % of one or more proteins, and about 3 wt. % to about 6 wt. % of a fortification blend, based on the total weight of the energy bar. A variety of other components may be included in the preferred compositions described above.

Comparative Example 1

Results of a consumer taste study that was conducted using the methodology described above, for POWERBAR® CHOCOLATE PEANUT BUTTER (Chewy Type of Energy Bar) are presented in Table 2.

POWERBAR® CHOCOLATE PEANUT BUTTER (Chewy Type of Energy Bar) Mean Hedonic Score of 4.78 (SD=1.38) with N=75

TABLE 2

| Confidence Interval | Lower Limit | Mean Hedonic Score | Upper Limit |
| --- | --- | --- | --- |
| 99% | 4.41 | 4.78 | 5.15 |
| 95% | 4.47 | 4.78 | 5.09 |
| 90% | 4.52 | 4.78 | 5.04 |
| 80% | 4.65 | 4.78 | 4.91 |
| 70% | 4.70 | 4.78 | 4.86 |
| 60% | 4.74 | 4.78 | 4.82 |

Comparative Example 2

Results of a consumer taste study that was conducted using the methodology described above, for LUNA™ NUTZ OVER CHOCOLATE™ BAR (Grain Based Type of Energy Bar) are presented in Table 3.

LUNA™ NUTZ OVER CHOCOLATE™ BAR (Grain Based Type of Energy Bar) Mean Hedonic Score of 5.06 (SD=1.48) with N=75

TABLE 3

| Confidence Interval | Lower Limit | Mean Hedonic Score | Upper Limit |
| --- | --- | --- | --- |
| 99% | 4.66 | 5.06 | 5.46 |
| 95% | 4.73 | 5.06 | 5.39 |
| 90% | 4.78 | 5.06 | 5.34 |
| 80% | 4.92 | 5.06 | 5.20 |
| 70% | 4.97 | 5.06 | 5.15 |
| 60% | 5.02 | 5.06 | 5.10 |

Example 1

Inventive Prototype I is a chewy energy bar that was processed under low shear and low temperature conditions. The recipe and procedure are provided below.

| | WT. % |
| --- | --- |
| Syrup Blend Mixture Ingredient | |
| Corn Syrup Blend | 24.27 |
| Consisting of High Fructose, 63 DE corn syrup, and glycerin | |
| Solid Component Matrix Ingredient | |
| Protein Blend | 29.21 |
| Consisting of Whey Protein Isolate, Calcium Caseinate, Soy Protein Isolate and peanut flour or their derivatives | |
| Peanut Butter | 1.46 |
| Sucrose | 2.24 |
| Salt | 0.58 |
| Fortification Blend | 3.50 |
| Flavorings | 2.27 |
| Artificial and/or Natural flavors such as vanillin, cinnamon and cocoa powder | |
| Center Mixture Ingredient | |
| Caramel | 24.81 |
| Peanut Splits | 11.66 |
| | 100.00 |

The ingredients in the solid blend mixture were placed in an 11 cu. ft. jacketed Z-blade mixer. The mixer was operating at about 45 rpm and the mixer's jacket was maintained at a temperature of about 60° C. The syrup blend was added to the Z-blade mixer at a temperature of about 60° C. and mixed with the ingredients from the solid blend mixture, for approximately 3 minutes, to form the energy bar matrix. Operating the mixer under these conditions, that is under low temperature and low shear conditions, preserved the integrity of the ingredients that were added.

In a separate mixer, caramel and peanut splits were combined to form the center mixture.

A portion of the energy bar matrix was cooled and formed into a slab using a first set of forming rolls. The center mixture was also cooled and formed into a slab using a second set of forming rolls, and then applied on top of the energy bar matrix slab. The remaining portion of the energy bar matrix was cooled and formed into a slab using a third set of forming rolls, and then placed on top of the center mixture layer, thereby creating a three layered slab. The three layered slab was then further cooled, slit, cut into bar shapes, and packaged.

Results of the consumer taste study that was conducted using the methodology described above, for Inventive Prototype I (Chewy Type of Energy Bar) are presented in Table 4.

Inventive Prototype I (Chewy Type of Energy Bar)

Made using low shear and low temperature processing

Mean Hedonic Score of 5.20 (SD=1.33) with N=75

TABLE 4

| Confidence Interval | Lower Limit | Mean Hedonic Score | Upper Limit |
| --- | --- | --- | --- |
| 99% | 4.84 | 5.20 | 5.56 |
| 95% | 4.90 | 5.20 | 5.50 |
| 90% | 4.95 | 5.20 | 5.45 |
| 80% | 5.07 | 5.20 | 5.33 |
| 70% | 5.12 | 5.20 | 5.28 |
| 60% | 5.16 | 5.20 | 5.24 |

Example 2

Inventive Prototype II is a chewy energy bar that was processed under low shear and low temperature conditions. In addition, a fat-carbohydrate matrix was included. The recipe and procedure are provided below.

| | WT. % |
|---|---|
| Syrup Blend Mixture Ingredient | |
| Corn Syrup Blend Consisting of High Fructose, 63 DE corn syrup, and glycerin | 22.72 |
| Solid Component Matrix Ingredient | |
| Protein Blend Consisting of Whey Protein Isolate, Calcium Caseinate, Soy Protein Isolate and peanut flour or their derivatives | 23.25 |
| Peanut Butter | 1.36 |
| Sucrose | 2.10 |
| Salt | 0.55 |
| Fortification Blend | 3.49 |
| Flavorings Artificial and/or Natural flavors such as vanillin, cinnamon and cocoa powder | 2.13 |
| Fat-carbohydrate Matrix Ingredient | |
| Caramel | 6.15 |
| Center Mixture Ingredient | |
| Caramel | 23.23 |
| Soy Nuggets | 4.11 |
| Peanut Splits | 10.91 |
| | 100.00 |

The ingredients in the solid blend mixture were placed in an 11 cu. ft. jacketed Z-blade mixer. The mixer was operating at about 45 rpm and the mixer's jacket was maintained at a temperature of about 60° C. The syrup blend was added to the Z-blade mixer at a temperature of about 60° C. and mixed with the ingredients from the solid blend mixture, for approximately 3 minutes, to form the energy bar matrix. Operating the mixer under these conditions, that is under low temperature and low shear conditions, preserved the integrity of the ingredients that were added.

Caramel (a fat-carbohydrate matrix) was then added to the Z-blade mixer onto the energy bar matrix. The two components were mixed at about 45 rpm for about 45 seconds, allowing the caramel to be folded into the energy bar matrix. Mixing was stopped when there were no visible caramel clumps left. The combined components formed an improved energy matrix.

In a separate mixer, caramel, soy nuggets, and peanut splits were combined to form the center mixture.

A portion of the improved energy matrix was cooled and formed into a slab using a first set of forming rolls. The center mixture was also cooled and formed into a slab using a second set of forming rolls, and then applied on top of the improved energy matrix slab. The remaining portion of the improved energy matrix was cooled and formed into a slab using a third set of forming rolls, and then placed on top of the center mixture layer, thereby creating a three layered slab. The three layered slab was then further cooled, slit, cut into bar shapes, and packaged.

Results of the consumer taste study that was conducted using the methodology described above, for Inventive Prototype II (Chewy Type of Energy Bar) are presented in Table 5.

Inventive Prototype II (Chewy Type of Energy Bar)
Made using low shear and low temperature processing, and with fat-carbohydrate matrix (caramel) included
Mean Hedonic Score of 5.64 (SD=1.12) with N=75

TABLE 5

| Confidence Interval | Lower Limit | Mean Hedonic Score | Upper Limit |
|---|---|---|---|
| 99% | 5.34 | 5.64 | 5.94 |
| 95% | 5.39 | 5.64 | 5.89 |
| 90% | 5.43 | 5.64 | 5.85 |
| 80% | 5.53 | 5.64 | 5.75 |
| 70% | 5.58 | 5.64 | 5.71 |
| 60% | 5.60 | 5.64 | 5.68 |

Example 3

Inventive Prototype III is a grain based energy bar that was processed under low shear and low temperature conditions. The recipe and procedure are provided below.

| | WT % |
|---|---|
| Syrup Blend Mixture Ingredient | |
| Corn Syrup Blend Consisting of 63 DE corn syrup and glycerin | 33.68 |
| Solid Blend Mixture Ingredient | |
| Grain Blend Consisting of Oats, Crisp Rice, and Wheat Flakes | 16.42 |
| Protein Blend Consisting of Calcium Caseinate, Soy Protein Isolate and peanut flour or their derivatives | 23.92 |
| Peanut Butter | 5.26 |
| Peanut Splits | 9.54 |
| Sucrose | 4.49 |
| Salt | 0.49 |
| Fortification Blend | 4.54 |
| Flavorings Artificial and/or Natural flavors such as vanillin, cinnamon and cocoa powder | 1.66 |
| | 100.00 |

The ingredients in the solid blend mixture were placed in an 11 cu. ft. jacketed Z-blade mixer. The mixer was operating at about 45 rpm and the mixer's jacket was maintained at a temperature of about 60° C. The syrup blend was added to the Z-blade mixer at a temperature of about 60° C. and mixed with the ingredients from the solid blend mixture, for approximately 3 minutes. Operating the mixer under these conditions, that is under low temperature and low shear conditions, preserved the integrity of the ingredients that were added.

The resulting energy bar matrix was cooled and formed into a slab using forming rolls. The slab was further cooled, slit, cut into bar shapes, and packaged.

Results of the consumer taste study that was conducted using the methodology described above, for Inventive Prototype III (Grain Based Type of Energy Bar) are presented in Table 6.

Inventive Prototype III (Grain Based Type of Energy Bar)
Made using low shear and low temperature processing
Mean Hedonic Score of 6.02 (SD=0.71) with N=75

TABLE 6

| Confidence Interval | Lower Limit | Mean Hedonic Score | Upper Limit |
| --- | --- | --- | --- |
| 99% | 5.83 | 6.02 | 6.21 |
| 95% | 5.86 | 6.02 | 6.18 |
| 90% | 5.89 | 6.02 | 6.15 |
| 80% | 5.95 | 6.02 | 6.09 |
| 70% | 5.98 | 6.02 | 6.06 |
| 60% | 6.00 | 6.02 | 6.04 |

Example 4

Sensory testing was performed on three energy bars that were made using soy protein isolates of varying mean particle diameters. Sample A was prepared by mixing 12.1 wt. % of a soy protein isolate, where about 50 to 60 wt. % of the soy protein isolate had a mean particle diameter of about 16 microns, into an energy bar product. Sample B was prepared using the same procedure as Sample A, except that the soy protein isolate of sample B had a mean particle diameter of about 33 microns (about 50 to 60 wt. % of the soy protein isolate). Sample C was prepared using the same procedure as Sample A, except that the soy protein isolate of sample C had a mean particle diameter of about 54 microns (about 50 to 60 wt. % of the soy protein isolate). It should be noted that the protein content for all soy protein isolate samples was 90% protein.

The participants rated samples A, B, and C for mouth drying sensation based on a scale from 0 to 15. 0 being the best and 15 the worst. A score of 5 is considered ideal. The samples were scored by the participants as follows:

| Sample | Score |
| --- | --- |
| Sample A (16 microns) | 13.5 |
| Sample B (33 microns) | 10.0 |
| Sample C (54 microns) | 8.5 |

The results demonstrate that as the mean particle size of the protein powder increases, the mouth drying sensation decreases.

Example 5

A chewy energy bar product, sample B, is made following the steps of the energy bar of Example 2, with the exception that the protein powder that is to be used will have a particle size distribution such that about 30 wt. % of the protein powder has a mean particle size of about 35 microns. Upon consumer testing of the product, sample B, is expected to achieve the mean hedonic scores shown in Table 7 below:

TABLE 7

| Confidence Interval | Lower Limit | Mean Hedonic Score | Upper Limit |
| --- | --- | --- | --- |
| 99% | 5.4 | 5.70 | 6.0 |
| 95% | 5.45 | 5.70 | 5.95 |
| 90% | 5.5 | 5.70 | 5.9 |
| 80% | 5.59 | 5.70 | 5.81 |
| 70% | 5.63 | 5.70 | 5.77 |
| 60% | 5.66 | 5.70 | 5.74 |

Similarly, a grain based energy bar product, sample C, is made in the same manner described in the invention summary, with the exception that the protein powder to be used will have a particle size distribution such that about 30 wt. % of the protein powder has a mean particle size of about 35 microns. Upon consumer testing of the product, sample C, is expected to achieve the mean hedonic scores shown in Table 8 below:

TABLE 8

| Confidence Interval | Lower Limit | Mean Hedonic Score | Upper Limit |
| --- | --- | --- | --- |
| 99% | 5.85 | 6.04 | 6.23 |
| 95% | 5.88 | 6.04 | 6.20 |
| 90% | 5.91 | 6.04 | 6.17 |
| 80% | 5.97 | 6.04 | 6.11 |
| 70% | 6.0 | 6.04 | 6.08 |
| 60% | 6.02 | 6.04 | 6.06 |

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. An energy bar having a mean hedonic score for consumer acceptability of at least about 5.2, wherein said energy bar has about 15 to about 45 g of carbohydrates, about 1 to about 4.5 g of fortification components, about 8 to about 40 g of protein, about 3 to about 8 g of fat, about 150 to about 300 calories, and a moisture content of less than about 15% by weight, based on a 55 g serving size, wherein said carbohydrates are selected from the group consisting of starch, sugar, gels, syrups, honey, molasses, and combinations thereof, said fortification components are selected from the group consisting of vitamins, minerals, and combinations thereof, said protein is selected from the group consisting of whey protein, milk protein, egg protein, casein, peanut flour, nut meats, vegetable protein, and combinations thereof, and said fat is selected from the group consisting of chocolate, peanut butter, fat substitutes, vegetable fats, tropical fats, animal fats and combinations thereof.

2. The energy bar of claim 1, at a 60% confidence level.

3. A grain based energy bar having a mean hedonic score for consumer acceptability of at least about 5.2, wherein said energy bar has about 15 to about 45 g of carbohydrates, about 1 to about 4.5 g of fortification components, about 8 to about 40 g of protein, about 3 to about 8 g of fat, about 150 to about 300 calories, and a moisture content of less than about 15% by weight, based on a 55 g serving size, and wherein said carbohydrates are selected from the group consisting of starch, sugar, gels, syrups, honey, molasses, and combinations thereof, said fortification components are selected from the group consisting of vitamins, minerals, and combinations thereof, said protein is selected from the group consisting of whey protein, milk protein, egg protein, casein, peanut flour, nut meats, vegetable protein, and combinations thereof, and said fat is selected from the group consisting of chocolate, peanut butter, fat substitutes, vegetable fats, tropical fats, animal fats and combinations thereof.

4. The energy bar of claim 3, wherein said energy bar has process sensitive ingredients that are processed in a manner to preserve the integrity of said process sensitive ingredients by controlling the temperature and shear energy imparted on said process sensitive ingredients.

5. The energy bar of claim 3, wherein said energy bar includes protein powder that has a particle size distribution such that at least about 30 wt. % of said protein powder has a mean particle size of at least about 35 microns.

6. A chewy energy bar having a mean hedonic score for consumer acceptability of at least about 4.9, wherein said energy bar has about 15 to about 45 g of carbohydrates, about 1 to about 4.5 g of fortification components, about 8 to about 40 g of protein, about 3 to about 8 g of fat, about 150 to about 300 calories, and a moisture content of less than about 15% by weight, based on a 55 g serving size, and wherein said carbohydrates are selected from the group consisting of starch, sugar, gels, syrups, honey, molasses, and combinations thereof, said fortification components are selected from the group consisting of vitamins, minerals, and combinations thereof, said protein is selected from the group consisting of whey protein, milk protein, egg protein, casein, peanut flour, nut meats, vegetable protein, and combinations thereof, and said fat is selected from the group consisting of chocolate, peanut butter, fat substitutes, vegetable fats, tropical fats, animal fats and combinations thereof.

7. The energy bar of claim 6, wherein said energy bar has process sensitive ingredients that are processed in a manner to preserve the integrity of said process sensitive ingredients by controlling the temperature and shear energy imparted on said process sensitive ingredients.

8. The energy bar of claim 6, wherein said energy bar has protein powder that has a particle size distribution such that at least about 30 wt. % of said protein powder has a mean particle size of at least about 35 microns.

9. The energy bar of claim 6, wherein said energy bar has a fat-carbohydrate matrix that is gently folded into an energy bar matrix, wherein said energy bar matrix is comprised of one or more solid components, and one or more carbohydrate based syrups.

10. The energy bar of claim 9, wherein said fat-carbohydrate matrix is selected from the group consisting of caramel, fondants, truffles, creams, ganache, mousse, chocolate, and mixtures thereof.

11. The energy bar of claim 6, wherein said energy bar has inclusions that are comprised of fortification ingredients.

12. An energy bar made by the process comprising the steps of:
(a) mixing one or more solid components and one or more carbohydrate based syrups to form an energy bar matrix;
(b) mixing said energy bar matrix with a fat-carbohydrate matrix to form an enhanced energy bar matrix, wherein said fat-carbohydrate matrix is comprised of one or more fats and one or more carbohydrate components, and
(c) forming said enhanced energy bar matrix into said energy bar, wherein said energy bar has a lubricious mouthfeel, and
wherein said energy bar has about 15 to about 45 g of carbohydrates, about 1 to about 4.5 g of fortification components, about 8 to about 40 g of protein, about 3 to about 8 g of fat, about 150 to about 300 calories, and a moisture content of less than about 15% by weight, based on a 55 g serving size, and
wherein said carbohydrates are selected from the group consisting of starch, sugar, gels, syrups, honey, molasses, and combinations thereof, said fortification components are selected from the group consisting of vitamins, minerals, and combinations thereof, said protein is selected from the group consisting of whey protein, milk protein, egg protein, casein, peanut flour, nut meats, vegetable protein, and combinations thereof, and said fat is selected from the group consisting of chocolate, peanut butter, fat substitutes, vegetable fats, tropical fats, animal fats and combinations thereof.

13. The energy bar of claim 12, wherein said energy bar has a mean hedonic score of at least about 5.2.

14. A method of making an energy bar comprising the steps of:
(a) mixing one or more solid components and one or more carbohydrate based syrups to form an energy bar matrix;
(b) mixing said energy bar matrix with a fat-carbohydrate matrix to form an enhanced energy bar matrix, wherein said fat-carbohydrate matrix is comprised of one or more fats and one or more carbohydrate components, and
(c) forming said enhanced energy bar matrix into said energy bar, wherein said energy bar has a lubricious mouthfeel, and
wherein said energy bar has about 15 to about 45 g of carbohydrates, about 1 to about 4.5 g of fortification components, about 8 to about 40 g of protein, about 3 to about 8 g of fat, about 150 to about 300 calories, and a moisture content of less than about 15% by weight, based on a 55 g serving size, and
wherein said carbohydrates are selected from the group consisting of starch, sugar, gels, syrups, honey, molasses, and combinations thereof, said fortification components are selected from the group consisting of vitamins, minerals, and combinations thereof, said protein is selected from the group consisting of whey protein, milk protein, egg protein, casein, peanut flour, nut meats, vegetable protein, and combinations thereof, and said fat is selected from the group consisting of chocolate, peanut butter, fat substitutes, vegetable fats, tropical fats, animal fats and combinations thereof.

15. The method of claim 14, wherein said energy bar has a mean hedonic score of at least about 5.2.

16. A method for improving the mean hedonic score of an energy bar, comprising one or more of the following steps: (a) processing process sensitive ingredients in a manner to preserve the integrity of said process sensitive ingredients by controlling the temperature and/or shear energy imparted on said process sensitive ingredients; (b) including a fat-carbohydrate matrix with an energy bar matrix; and (c) using protein powders that have a particle size distribution such that at least about 30 wt. % of said protein powder has a mean particle size of at least about 35 microns,
wherein said energy bar has about 15 to about 45 g of carbohydrates, about 1 to about 4.5 g of fortification components, about 8 to about 40 g of protein, about 3 to about 8 g of fat, about 150 to about 300 calories, and a moisture content of less than about 15% by weight, based on a 55 g serving size, and
wherein said carbohydrates are selected from the group consisting of starch, sugar, gels, syrups, honey, molasses, and combinations thereof, said fortification components are selected from the group consisting of vitamins, minerals, and combinations thereof, said protein is selected from the group consisting of whey protein, milk protein, egg protein, casein, peanut flour, nut meats, vegetable protein, and combinations thereof, and said fat is selected from the group consisting of chocolate, peanut butter, fat substitutes, vegetable fats, tropical fats, animal fats and combinations thereof.

17. The method of claim 16, wherein step (a) is used to produce a hedonic gain of about 0.4 points.

18. The method of claim 16, wherein steps (a) and (b) are used to produce a hedonic gain of about 0.6 points.

19. An energy bar having a mean hedonic score for consumer acceptability of at least about 5.2, wherein said energy bar has about 15 to about 45 g of carbohydrates, about 1 to about 4.5 g of fortification components, about 8 to about 40 g of protein, about 3 to about 8 g of fat, about 150 to about 300 calories, and a moisture content of less than about 15% by weight, based on a 55 g serving size, and wherein said energy bar is comprised of an energy bar matrix combined with a fat-carbohydrate matrix in a weight ratio of about 99:1 to about 80:20, and the energy bar matrix is comprised of a solid component selected from the group consisting of corn starch, oat, rice, wheat, barley, cereal, grains, sorghum, protein, salt, flavors, cocoa powder, flour, fortification components, sugars, and combinations thereof, and a carbohydrate based syrup selected from the group consisting of corn syrups, liquid sucrose, honey, high fructose corn syrup, glycerin, and combinations thereof, and the fat-carbohydrate matrix is comprised of about 2 wt. % to about 25 wt. % of one or more fat components selected from the group consisting of chocolate, peanut butter, fat substitutes, vegetable fats, tropical fats, animal fats and combinations thereof, and about 10 wt. % to about 75 wt. % of one or more carbohydrate components selected from the group consisting of starch, sugar, gels, syrups, honey, molasses, and combinations thereof, and wherein said carbohydrates are selected from the group consisting of starch, sugar, gels, syrups, honey, molasses, and combinations thereof, said fortification components are selected from the group consisting of vitamins, minerals, and combinations thereof, said protein is selected from the group consisting of whey protein, milk protein, egg protein, casein, peanut flour, nut meats, vegetable protein, and combinations thereof, and said fat is selected from the group consisting of chocolate, peanut butter, fat substitutes, vegetable fats, tropical fats, animal fats and combinations thereof.

20. An energy bar having a mean hedonic score for consumer acceptability of at least about 5.2, wherein said energy bar has about 15 to about 45 g of carbohydrates, about 1 to about 4.5 g of fortification components, about 8 to about 40 g of protein, about 3 to about 8 g of fat, about 150 to about 300 calories, and a moisture content of less than about 15% by weight, based on a 55 g serving size, wherein said protein is comprised of protein powder and at least 30 wt. % of the protein powder has a mean particle size of at least about 35 microns, and wherein said carbohydrates are selected from the group consisting of starch, sugar, gels, syrups, honey, molasses, and combinations thereof, said fortification components are selected from the group consisting of vitamins, minerals, and combinations thereof, said protein is selected from the group consisting of whey protein, milk protein, egg protein, casein, peanut flour, nut meats, vegetable protein, and combinations thereof, and said fat is selected from the group consisting of chocolate, peanut butter, fat substitutes, vegetable fats, tropical fats, animal fats and combinations thereof.

21. The energy bar of claim 20, wherein said protein powder is selected from the group consisting of animal protein, plant protein, whey protein, soy protein, milk protein, egg protein, casein, peanut flour, nut meats, and combinations thereof.

22. The energy bar of claim 20, wherein said protein powder has a particle size distribution such that at least 50% of the particles have a mean particle diameter in the range from about 35 to about 175 microns and less than 10% of the particles have a mean particle diameter in the range from about 10 to about 50 microns.

* * * * *